US008428897B2

(12) United States Patent
Richmond (10) Patent No.: US 8,428,897 B2
(45) Date of Patent: Apr. 23, 2013

(54) METHOD AND APPARATUS FOR SPECTRAL CROSS COHERENCE

(75) Inventor: Christ D. Richmond, Dorchester, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 609 days.

(21) Appl. No.: 12/417,907

(22) Filed: Apr. 3, 2009

(65) Prior Publication Data

US 2010/0106440 A1    Apr. 29, 2010

Related U.S. Application Data

(60) Provisional application No. 61/123,357, filed on Apr. 8, 2008, provisional application No. 61/124,042, filed on Apr. 14, 2008.

(51) Int. Cl.
*G01R 29/26* (2006.01)
*G06G 7/00* (2006.01)

(52) U.S. Cl.
USPC ........... 702/71; 356/303; 706/24; 704/E19.01

(58) Field of Classification Search ............ 702/71
See application file for complete search history.

(56) References Cited

U.S. PATENT DOCUMENTS

| | | | | |
|---|---|---|---|---|
| 4,750,147 A * | 6/1988 | Roy et al. | ........... | 708/801 |
| 5,103,431 A * | 4/1992 | Freeman et al. | ........... | 367/135 |
| 5,168,459 A * | 12/1992 | Hiller | ........... | 708/322 |
| 5,459,668 A * | 10/1995 | Dogan et al. | ........... | 701/223 |
| 5,671,168 A * | 9/1997 | Liu et al. | ........... | 708/321 |
| 6,002,645 A * | 12/1999 | Booth | ........... | 367/123 |
| 6,377,213 B1 * | 4/2002 | Odachi et al. | ........... | 342/383 |
| 6,798,380 B2 * | 9/2004 | Li et al. | ........... | 342/368 |
| 6,822,606 B2 * | 11/2004 | Ponsford et al. | ........... | 342/192 |
| 7,009,912 B1 * | 3/2006 | Haley | ........... | 367/124 |
| 7,486,230 B2 * | 2/2009 | Takano et al. | ........... | 342/189 |
| 7,847,733 B2 * | 12/2010 | Shirakawa | ........... | 342/417 |
| 2008/0122681 A1 * | 5/2008 | Shirakawa | ........... | 342/147 |
| 2009/0112606 A1 * | 4/2009 | Mehrotra et al. | ........... | 704/500 |
| 2010/0142390 A1 * | 6/2010 | Sun et al. | ........... | 370/252 |

OTHER PUBLICATIONS

Hawkes, Malcolm/ Nehorai, Arye; "Acoustic Vector Sensor Beamforming and Capon Direction Estimation"; Sep. 1998; IEEE Transactions on Signal Processing; vol. 46, No. 9; pp. 2292, 2295.*

(Continued)

*Primary Examiner* — Jayprakash N Gandhi
*Assistant Examiner* — Rhadames J. Alonzo Miller
(74) *Attorney, Agent, or Firm* — Hamilton, Brook, Smith & Reynolds, P.C.

(57) ABSTRACT

The present invention relates to a machine implemented method for spectral analysis that determines a measure of cross coherence between application of two spectral estimation filters to data; and identifies a spectral feature of the measure of cross coherence. One example embodiment of the present invention provides a complete statistical summary of the joint dependence of the Bartlett and Capon power spectral statistics, showing that the coupling is expressible via a 2×2 complex Wishart matrix, where the degree coupling is determined by a single measure of cross coherence defined herein. This measure of coherence leads to a new two-dimensional algorithm capable of yielding significantly better resolution than the Capon algorithm, often commensurate with but at times exceeding finite sample based MUSIC.

32 Claims, 6 Drawing Sheets

OTHER PUBLICATIONS

Capon, J. et al., "Probability Distributions for Estimators of Frequency-Wavenumber Spectrum," *Proceedings of the IEEE*, vol. 58, No. 10: 1785-1786 (Apr. 1970).

Cox, H., "Resolving Power and Sensitivity to Mismatch of Optimum Array Processors," *Journal of the Acoustical Society of America*, vol. 54, No. 3: 771-785 (Jan. 1973).

Maiwald, D. et al., "Calculation of Moments of Complex Wishart and Complex Inverse Wishart Distributed Matrices," *IEE Proc.-Radar, Sonar, Navig.*, vol. 147, No. 4: 162-168 (Aug. 2000).

Muirhead, R.J., Chapter 3.2 (pp. 85-108): "The Wishart Distribution" and Chapter 5.1 (pp. 144-164): "Ordinary Correlation Coefficients" in *Aspects of Multivariate Statistical Theory*, John Wiley & Sons, Inc. (1982).

Richmond, C.D. et al. "Asymptotic Mean Squared Error Performance of Diagonally Loaded Capon-MVDR Algorithm," *Proceedings of the Thirty-Ninth Asilomar Conference on Signals, Systems & Computers*, pp. 1711-1716 (Oct. 28-Nov. 1, 2005).

Richmond, C.D,, "Capon Algorithm Mean-Squared Error Threshold SNR Prediction and Probability of Resolution," *IEEE Transactions on Signal Processing*, vol. 53, No. 8: 2748-2764 (Aug. 2005).

Steinhardt, A., "Adaptive Multisensor Detection and Estimation," Chapter 3 of *Adaptive Radar Detection and Estimation*, Edited by S. Haykin and A. Steinhardt, John Wiley & Sons, Inc., pp. 91-160 (1992).

P, Stoica, et al., Chapters 1.1-1.5 in *Spectral Analysis of Signals*, Pearson Prentice-Hall, Upper Saddle River, New Jersey, pp. 1-13 (2005).

Capon, J. "High-Resolution Frequency-Wavenumber Spectrum Analysis," *Proceedings of the IEEE*, vol. 57: 1408-4418 (Aug. 1969).

Bartlett, M.S., "Smoothing Periodograms from Time Series with Continuous Spectra," *Nature*, vol. 161: 686-687 (Jun. 1948).

Bartlett, M.S., "Periodogram Analysis and Continuous Spectra," *Biometrika*, vol. 37: 1-16 (Jun. 1950).

Richmond, C.D., "Cross Coherence and Joint PDF of the Bartlett and Capon Power Spectral Estimates," *Proceedings of the IEEE International Conference on Acoustics, Speech, and Signal Processing*, vol. II:, 901-904, Honolulu, Hawaii (Apr. 15-20, 2007).

A. J. Barabell, J. Capon, D. F. Delong, J. R. Johnson, and K. Senne, "Performance Comparison of Superresolution Array Processing Algorithms," Project Report TST-72, Lincoln Laboratory, MIT, 1984.

Forsythe, K.W., "Utilizing Waveform Features for Adaptive Beamforming and Direction Finding with Narrowband Signals," *MIT Lincoln Laboratory Journal*, vol. 10, No. 2:. 99-126 (1997).

Lagunas, M. et al., "Maximum Likelihood Filters in Spectral Estimation Problems," *Signal Processing*, vol. 10, Issue 1: 19-34 (Jan. 1986).

Jakobsson, A. et al., "Estimating and Time-Updating the 2-D Coherence Spectrum," *IEEE Transactions on Signal Processing*, vol. 55, No. 5: 2350-2354 (May 2007).

Benesty, J. et al,, "A Generalized MVDR Spectrum," *IEEE Signal Processing Letters*, vol. 12: 827-830 (Dec. 2005).

B. Agee, "The copy/DF approach to signal-specific emitter location," Proceedings of the IEEE Asilomar Conference on Signals, Systems, and Computers, pp. 994-999, 1991.

B. Agee, S. Bruzzone, M. Bromberg, "Exploitation of signal structure in array-based blind copy and copy-aided DF systems," Proceedings of the ICASSP, pp. 2489-2492, 1998.

\* cited by examiner

METHOD AND APPARATUS FOR SPECTRAL CROSS COHERENCE

RELATED APPLICATIONS

This application claims the benefit of U.S. Provisional Application Nos. 61/123,357, filed Apr. 8, 2008 and 61/124,042, filed on Apr. 14, 2008. The entire teachings of the above applications are incorporated herein by reference.

GOVERNMENT SUPPORT

This invention was supported, in whole or in part, by Naval Sea Systems under Air Force contract FA 8721-05-C-0002. The government has certain rights in the invention.

BACKGROUND OF THE INVENTION

In radar systems, where one of the goals is localizing a target, which may be a boat, an aircraft, an automobile, or a subsurface object, a signal (e.g., a propagating electromagnetic or acoustic wave) emanates from the target and arrives at a sensing location. The sensing location may include an array of sensors. Among the goals of the sensing location is often to estimate the relative direction of the target object. For this purpose, the concept of direction of arrival estimation is used to identify the direction of a propagating wave upon its arrival at the sensing location.

Direction of arrival estimation has many practical applications, including finding the direction from which an underwater sound source emanates; localizing objects in the night sky using a radio telescope; in beamforming algorithms in wireless communication systems, including multiple channel access (frequency division multiple access, time division multiple access, code division multiple access); defense applications such as radar and sonar for detecting enemy aircrafts or submarines or other vehicles; locationing in wireless communication networks for detecting user locations in scenarios such as emergency situations; point-to-point microwave for aligning transmit and receive antenna elements to achieve maximum link quality; and in satellite communications for tracking satellite systems.

The Bartlett and Capon algorithms are among methods used in the literature for direction of arrival estimation. The Bartlett algorithm results from a conventional (Fourier or beam-forming) approach to power spectral estimation and the Capon algorithm results from an adaptive approach. Both algorithms make use of an estimated data covariance matrix (EDC), such as the sample covariance matrix (SCM). The Bartlett algorithm relies directly on the EDC, while the Capon approach relies on the inverse of the EDC. When both statistics are made to depend on the same EDC, they are not independent in general.

Other well-known spectral estimation approaches exist, such as the Multiple Signal Classification (MUSIC), Estimation of Signal Parameters via Rotational Invariance Technique (ESPRIT), Maximum-Entropy (ME) [14], etc. A maximum-likelihood (ML) formulation leads to a M-dimensional spectral search algorithm where M is the number of signals present in the data, and therefore can be computationally very expensive. Hence, the focus herein is on approaches, whose search space does not grow with the number of signals present. Among these approaches, the MUSIC algorithm is often regarded as the benchmark performer in direction-of-arrival (DOA) estimation [14]. Indeed, when sources are well-separated, DOA estimates obtained thereby are known to be unbiased and efficient at high signal to noise ratios (SNR). The ability of MUSIC to resolve two closely spaced signals is also known to be slightly better than the Capon-minimum variance distortionless response (MVDR) algorithm [13]. Use of MUSIC, however, requires two important factors, namely perfect knowledge of 1) the total number of signals present, and 2) an eigen-decomposition of the estimated data covariance matrix. The Capon-MVDR algorithm does not require either of these factors, but produces DOA estimates that are consistent (in SNR) and asymptotically efficient (in SNR and sample support only). The Capon-MVDR algorithm requires a matrix inversion of the estimated data covariance, which although computationally expensive, requires fewer computations than a singular value decomposition (SVD) or an Eigen-decomposition. Additionally, the resolution performance of the Capon-MVDR algorithm is only modestly inferior to MUSIC. Hence, the Capon-MVDR algorithm is often attractive in practice.

SUMMARY OF THE INVENTION

A method or corresponding apparatus in an example embodiment of the present invention relates to a machine implemented method for spectral analysis in computing hardware that determines a measure of cross coherence between application of plural spectral estimation filters to data and identifies a spectral feature of the measure of cross coherence. In a preferred embodiment the measure of cross coherence is between application of two spectral estimation filters to data.

Another example embodiment of the present invention relates to a machine implemented method for spectral analysis in computing hardware, which scans data in a first filter; scans the data in a second filter; and cross-correlates outputs of the two filters.

Yet another example embodiment of the present invention relates to a machine implemented method for spectral analysis in computing hardware that filters data with a first filter to determine a region of interest, determines a measure of cross coherence between application of two spectral estimation filters to data based on the determined region of interest, and identifies a spectral feature of the measure of cross coherence.

The system may identify a spectral feature of the measure of cross coherence based on identifying largest peaks of an estimated power spectrum of the measure of cross coherence.

The system may identify the spectral feature of the measure of cross coherence as a means of obtaining direction of arrival angle estimates or frequency estimates of a wave. The wave may include an acoustic, electromagnetic, seismic, gravitational, or an optical wave. In order to identify the spectral feature of the measure of cross coherence, the system may identify largest peaks of an estimated power spectrum of the measure of cross coherence.

The system may determine the measure of cross coherence by determining a generalized cosine between beamformer filter weight vectors or frequency estimates corresponding to the two spectral estimation filters.

The system may apply a spectral estimation filter to the data and compute the measure of cross coherence to improve resolution performance. The system may obtain the data from a finite set of observations taken over time and assembled into a matrix. The system may obtain the data from an observation across an array of sensors. The system may obtain the data from observations taken across an array of sensors accrued over time and assembled into a data matrix. The system may process the data based on the spectral feature to improve resolution performance.

The system may calculate the measure of cross coherence based on beamforming weight vectors or spectral filtering weight vectors and a data covariance matrix estimate. The system may obtain the beamforming weight vectors as a function of position of sensors in an array used to obtain the data, a steering angle, direction of field propagation and field temporal frequency or other useful signal/field model parameters. The system may normalize the measure of cross coherence as a function of signal plus noise array observations to obtain a normalized spectral estimate.

The data may be scanned over n dimensions in the first filter, and over m dimensions in the second filter, and the output may be cross-correlated in n+m dimensions.

The first filter may be an adaptive filter or a non-adaptive filter. The second filter may be an adaptive or a non-adaptive filter. In a primary application, the first filter is an adaptive filter and the second filter is a non-adaptive filter.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
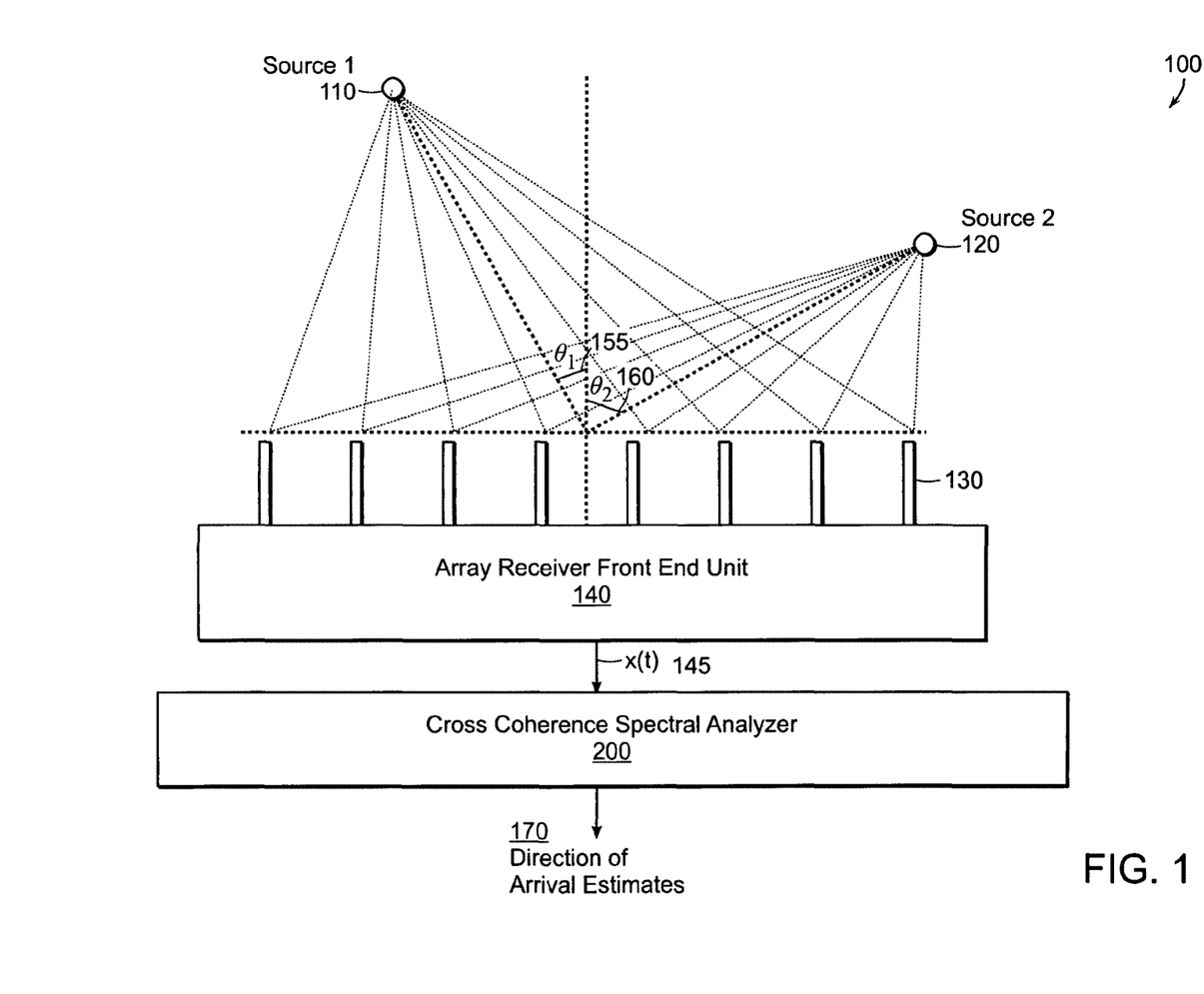
FIG. 1 is a block diagram of an example embodiment of the present invention.

FIG. 1 is a block diagram illustrating an example embodiment, wherein an angle of arrival estimation processor operates in an environment where a plurality sources of interest may be present. In this example embodiment, two sources 110, 120 are employed, where each source 110, 120 represents the origination point of a waveform (e.g., electromagnetic or acoustic wave). The waves propagate from the source locations 110, 120 to the sensor array 130 and arrives at the sensor array 130 at the incident angles $\theta_1$ 155 and $\theta_2$ 160. The sensor array 130 consists of a plurality of elements (e.g., sensors, hydrophones, vector sensors, antennas), where the number of elements is denoted by n. The array receiver front-end unit 140 takes the analog signal from the elements of the sensor array 130 and processes them into a format suitable for the cross coherence spectral analyzer 200. The output of the array receiver front-end unit 140 at a given time t is a vector measurement of n elements representing the complex amplitude of the wave intensity incident upon each element of the sensor array; also could be its complex envelope that may require an initial demodulation from a carrier frequency. The output of the array receiver front end unit 140 is denoted by a column vector x(t) 145.

The objective of the cross coherence spectral analyzer 200 is to exploit hidden structure that can be used for example to estimate the incident angles $\theta_1$ 155 and $\theta_2$ 160 (i.e., direction of arrival) with reasonable accuracy. In order to accomplish this direction of arrival estimate (i.e., frequency estimate), the cross coherence spectral analyzer 200 assembles the data x(t) 145, from the array receiver front end unit 140, over a number of observations, and employs these observations to arrive at direction of arrival estimates 170 of the incident waves. The cross coherence spectral analyzer 200 may include any programming apparatus or computer implemented program capable of executing the above steps.

Figure 2:
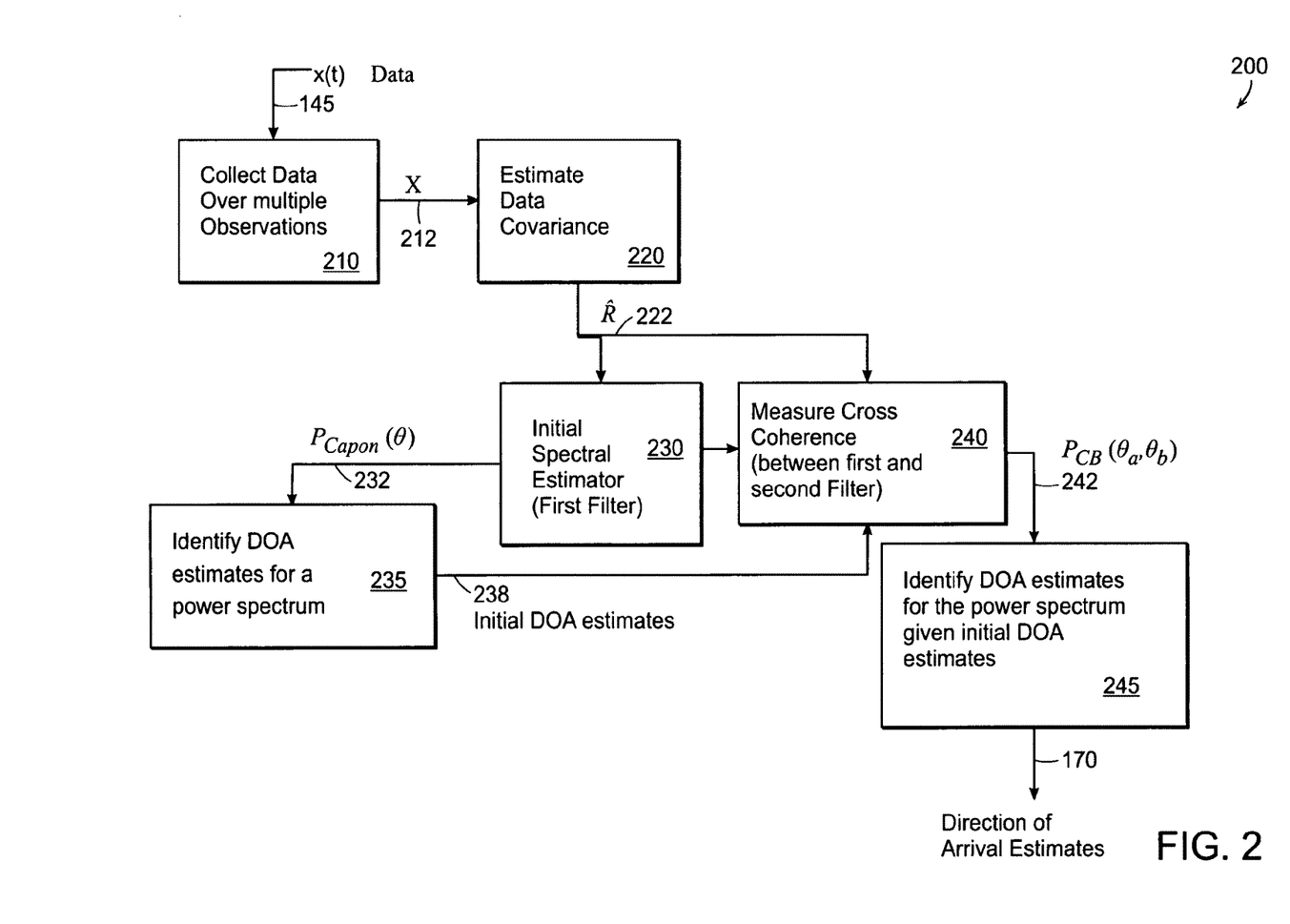
FIG. 2 demonstrates a flow chart of an example embodiment of a cross coherence spectral analyzer.

FIG. 2 demonstrates a flow chart of an example embodiment of the cross coherence spectral analyzer 200. The cross coherence spectral analyzer 200 collects 210 input data 145 over L time periods, represented by the column vectors $x_1(t), \ldots, x_L(t)$, which are subsequently assembled into an n×L matrix X 212.

The data matrix X 212 is subsequently fed into a data covariance estimation module 220, the output of which is denoted by $\hat{R}$ 222. An example embodiment of the data covariance estimation module 220 is the data covariance estimate obtained from the matrix product $XX^H$, where H denotes the Hermitian operator (i.e., the SCM).

The data covariance estimate $\hat{R}$ 222 is used as the input of an initial spectral estimator 230. An example embodiment of this initial spectral estimator 230 includes a Capon power spectral estimate. Other spectral estimators available in the art may be employed. The output 232 of the initial spectral estimator 230 is a power spectral estimate, denoted by $P_{Capon}(\theta)$ 232. The power spectral estimate $P_{Capon}(\theta)$ is also a function of the array response vector $v(\theta)$, which in turn may depend on varied system/signal parameters like those of the sensor array and propagation environment, including the position of the sensor in the array, a steering angle, direction of field propagation, and field temporal frequency.

This output 232 is then fed into a module 235 that estimates the direction of arrival (denoted by DOA in FIG. 2) for the power spectrum 232. This may be accomplished for example by identifying the angles at which the power spectrum 232 achieves its peak values.

The data covariance estimate $\hat{R}$ 222 is also fed into a module 240 that calculates a cross coherence estimate 242. An example embodiment of this cross spectral estimator 230 includes a spectral estimate based on the cross spectra of the Capon and Bartlett spectral estimates. Other cross spectral estimators may be employed. Additionally, the cross spectral estimates may be based upon the cross spectra of any number of power spectral estimators. The cross spectral estimate 242 is denoted by $P_{CB}(\theta_a, \theta_b)$, where first scan angle is $\theta_a$ and second filter scan angle is $\theta_b$. The parameters $\theta_a$ and $\theta_b$ can be vector parameters in general.

The cross spectral estimate 242, $P_{CB}(\theta_a, \theta_b)$, is then fed into a second direction of arrival estimation module 245. The angles 238 identified by the direction of arrival estimator 235 represent an initial estimate of the direction of arrival, and are used to assist the second direction of arrival estimation module 245.

In one example embodiment, the second direction of arrival estimation module 245 may restrict $\theta_b$ to be within a specified interval around any of the input angles 238 identified by the direction of arrival estimator 235. The second direction of arrival estimator 245 then searches for $\theta_a$ within a range $\theta_a - \epsilon \leq \theta_b \leq \theta_a + \epsilon$ over the restricted values of $\theta_b$. The term $\epsilon$ defines a region of interest around $\theta_b$ for which an acceptable value of $\theta_a$ can be determined. The criteria for selecting the direction of arrival estimate $\theta_a$ may be the angles at which the power spectrum 242 achieves its peak values, subject to the restrictions applied to angles $\theta_a$ and $\theta_b$. The second direction of arrival estimation module 245 then outputs the direction of arrival estimates 170.

Figure 3:
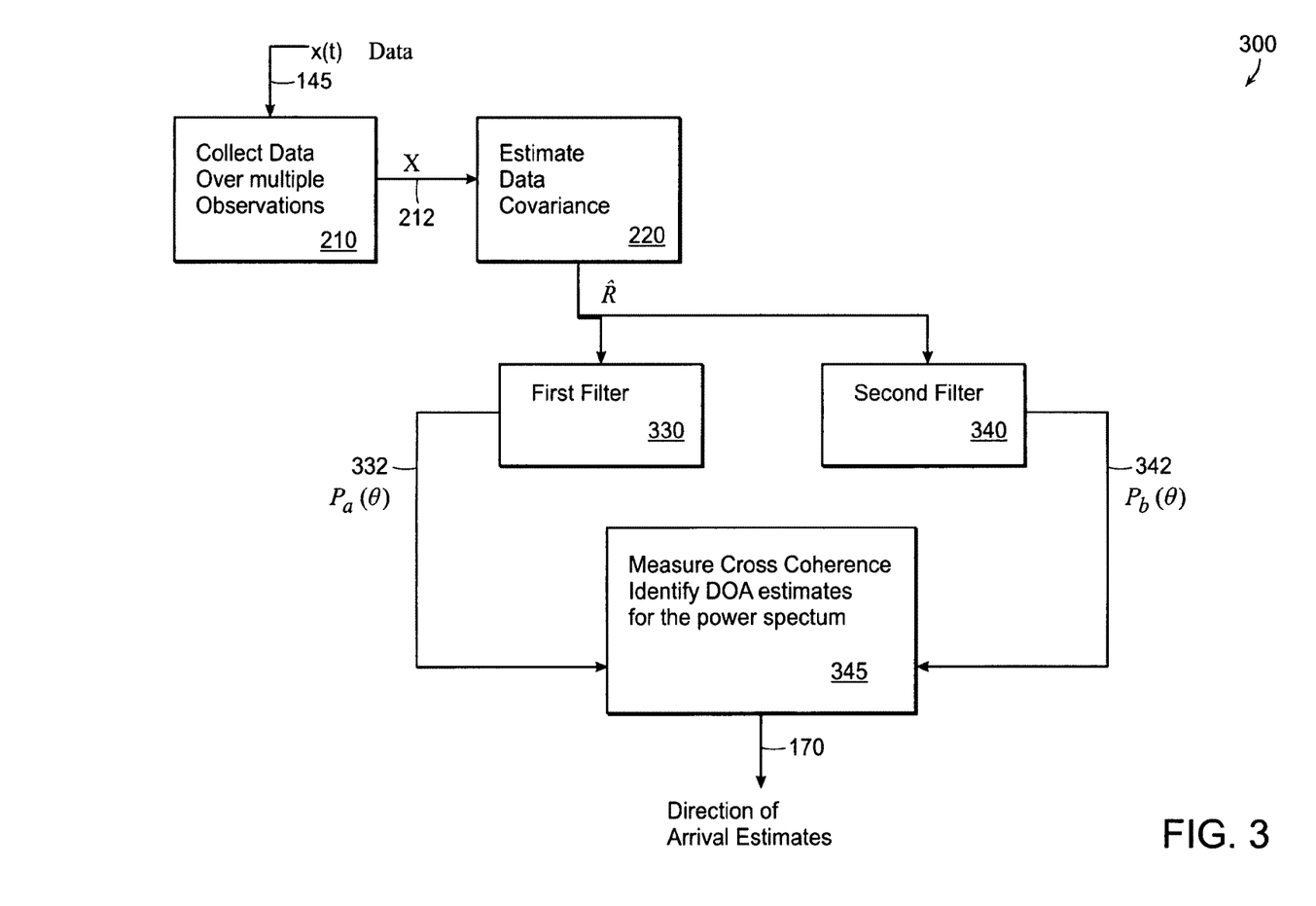
FIG. 3 demonstrates a flow chart of another embodiment for a cross coherence spectral analyzer.

FIG. 3 demonstrates another example embodiment of a cross coherence spectral analyzer.

The cross coherence spectral analyzer 200 collects 210 input data over L time periods, represented by the column vectors $x(t_1), \ldots, x(t_L)$, which are subsequently assembled into an n×L data matrix X 212.

The data X is subsequently fed into a data covariance estimation module 220, the output of which is denoted by $\hat{R}$. An example embodiment of the data covariance estimation module 220 is the data sample covariance matrix given by the matrix product $XX^H$, where H denotes the Hermitian operator.

The data covariance estimate $\hat{R}$ is also fed into a first filter 330 that calculates a power spectral estimate 332, denoted by $P_a(\theta)$. An example embodiment of the first filter 330 includes a Capon spectral estimate. Similarly, the data covariance estimate $\hat{R}$ is also fed into a second filter 340 that calculates a power spectral estimate 342, denoted by $P_b(\theta)$. An example embodiment of the second filter 340 includes a Bartlett spectral estimate. The output of the first filter 332 and the output of the second filter 342 are cross correlated in the direction of arrival (denoted by DOA in FIG. 3) estimator module 345, which is responsible for obtaining estimates of the direction of arrival 170 based on the spectral estimates $P_a(\theta)$ and $P_b(\theta)$.

One example embodiment may scan the data in the first filter 330 over n dimensions $\theta=[\theta_1, \ldots, \theta_n]^T$ and over m dimensions $\theta=[\theta_1, \ldots, \theta_m]^T$ in the second filter 340. The first 330 and the second 340 filters may be adaptive or non-adaptive. In a primary application, the first filter 330 is arranged to be adaptive and the second filter 340 is arranged as a non-adaptive filter. The output of the filters 330, 340 are then cross correlated over n+m directions to obtain a cross coherence estimate.

As described in [13], the teachings of which are incorporated by reference in its entirety, the Capon and Bartlett algorithms represent filterbank approaches to spectral estimation [9]. Data are obtained from an array of N sensors distributed in space. Each data observation taken across the array (called a spatial snapshot) is modeled as an N×1 zero mean complex Gaussian vector with representation $x=Sv(\theta)+n$, where the array response of the signal of interest associated with direction-of-arrival (DOA) parameter $\theta$ is given by $v(\theta)$, and its complex amplitude is Gaussian distributed such that $S \sim CN_1(0, \sigma_S^2)$, and the colored noise is denoted by n having covariance $E\{nn^H\}=R_N$, where $E\{.\}$ denotes the statistical expectation. Note that an example for a single signal case is $E\{x\}=0$ with $E\{xx^H\}=R=R_N+\sigma_S^2 v(\theta)v^H(\theta)$. A finite set of L array observations is accrued over time and assembled in a data matrix: $X=[x(1)|x(2)|\ldots|x(L)]$, where $l=1, 2, \ldots, L$. The spatial snapshots are used to form the unnormalized data spatial covariance estimate $\hat{R}=XX^H$, e.g., the unnormalized SCM, from which the Capon and Bartlett algorithms generate spatial power spectral estimates. It shall be assumed for theoretical analyses herein that $L \geq N$ guarantees SCM invertibility (this constraint on L is not required for application of ideas expressed herein).

One example embodiment of the present invention relates to an improved method of spectral analysis based on joint dependence of the Bartlett and Capon power spectral statistics, showing that the coupling is expressible via a 2×2 complex Wishart matrix, where the degree coupling is determined by a single measure of cross coherence defined herein. This measure of coherence leads to a new two-dimensional algorithm capable of yielding significantly better resolution than the Capon algorithm, often commensurate with but at times exceeding finite sample based MUSIC.

The Capon-Bartlett cross coherence spectrum is a two-stage general purpose spectral analyzer that can be used to assess the spectral content of data. Spectral analysis forms the basis of signal processing for many fields of study since the goal is often to identify periodicities in the data and/or to assess power distribution as a function of temporal/spatial frequency [9]. An example embodiment of the present invention builds on possible correlations between two well-known established approaches to spectral estimation: Bartlett (or smoothed periodogram) method [11, 12] and the Capon [or the data-adaptive minimum-variance distortionless response (MVDR)] method [9, 10]. When a given data set is processed via both the Bartlett and Capon algorithms, the CBCC can look for possible correlations in their outputs across different temporal/spatial frequencies (i.e. measure correlations across filters at different center frequencies). If original spectra are one dimensional then the net result is a two-dimensional (in frequency) spectrum where the second frequency/dimension provides additional information about the first frequency/dimension. This second frequency provides a dimension capable of improving the resolution of the 1-D Capon algorithm in a numerically efficient and simple manner. This improved resolution is achieved specifically for two closely spaced sources, or a collection of closely spaced pairs of sources each well separated from the other.

One embodiment of the present invention relates to spectral analysis that exploits the existing coherence (linear relationship) between a conventional Fourier-based approach (Bartlett) and the adaptive minimum-variance distortionless response (Capon or MVDR) approach. The conventional Bartlett algorithm is a filterbank approach to spectral estimation that averages over time the output power of the Fourier Transform (which for a given frequency bin is a crude bandpass filter) of the data. This algorithm is known to have resolution, i.e., ability to determine whether a single signal is present versus multiple closely spaced (in frequency or angle) signals, limited by the duration/length of integration (time window duration used for temporal Fourier transform, or in space the aperture length for sensor arrays). The Bartlett algorithm is known to be vulnerable to interference through its conventional filter sidelobes. The Capon algorithm is also a filterbank approach to spectral estimation but the filters are designed optimally. In particular each filter is designed to pass the frequency/direction of interest undistorted (a passband constraint), while minimizing the output power from all other frequencies/directions (a stopband constraint). The Capon filter solution depends on the true underlying data covariance matrix, has superior resolution capability (relative to the Bartlett algorithm) dependent on signal-to-noise ratio (SNR), and mitigates competing interfering signals via whitening, but is sensitive to errors in assumed array response and finite sample effects in covariance estimation [2, 6].

One example embodiment of the present invention estimates the coherence between the outputs of two processors. Cross-coherence is fundamentally a measure of linear relationship. Indeed, when two vectors/signals/functions/etc. are proportional to each other, then their cross-coherence is unity whereas orthogonal vectors have a cross-coherence of zero. These processors are dependent in general when based on the same data covariance even when evaluated at different frequencies. This new CBCC is a 2-D spectrum obtained by combining the 1-D spectra of the Bartlett and Capon algorithms in a way that is numerically efficient and provides a unique space in which improved resolving capability over the Capon algorithm is observed for two closely spaced signals.

The numerical efficiency is possible because the data-dependent part of the CBCC is separable and the inseparable part can be pre-computed and stored in memory [13]. Consider the challenge of estimating the directions-of-arrival (angles/spatial frequencies) of two planewave equal power signals in a background of white noise from observations made on an array of sensors (antennas, or hydrophones, e.g.). If a conventional Fourier based beam (conventional beamformer or CBF) is steered until its first natural null falls on one of these two signals, then the output of this beam will be nearly linearly related to the output of the adaptive Capon beam pointed at the other source. Thus, its measure of coherence will increase. The CBCC exploits this notion to obtain improved resolution by scanning CBF beams in the vicinity of an observed (often relatively wide) peak of the Capon processor.

An example embodiment of the present invention may be used as a general purpose spectral analysis tool with application in numerous areas including radar, sonar/underwater acoustics, seismology, astronomy, medical imaging, and communications. Angle-of-arrival estimation via an array of sensors is a common goal in several of these applications. Use of the CBCC as a second pass analysis tool to drill down into the data after a first pass Capon-MVDR spectral analysis has identified a region of interest (frequency band, angular sector, etc.) is the most likely approach. For example, a first pass of the Capon algorithm may suggest that one or more signals are coming from a particular direction, and use of the CBCC of the sector of angles in and around this area may reveal that in fact two closely spaced signals are present.

Advantages and Improvements Over Existing Methods

The CBCC spectrum helps close the gap in resolution performance between MUSIC and Capon-MVDR at very negligible computational cost. The improved resolution is obtained by searching in a second frequency domain over a new measure of cross coherence. This search along an additional dimension is only required after a first pass 1-D search with the Capon-MVDR algorithm has identified the regions of interest (locus of wide peaks in the 1-D spectrum). The CBCC closes the indicated performance gap primarily for two closely spaced sources, or sets well-separated closely spaced pairs of sources. If more than two sources are closely spaced, then MUSIC tends to resolve such larger clusters better [13].

Commercial Applications

The commercial applications are broad since spectral analysis is ubiquitous across many fields of discipline including radar, sonar/underwater acoustics, seismology, astronomy, medical imaging, and communications. Angle-of-arrival estimation via an array of sensors is a common goal in several of these applications. Use of the CBCC as a second pass analysis tool to drill down into the data after a first pass Capon-MVDR spectral analysis has identified a region of interest (frequency band, angular sector, etc. is the most likely approach). For example, a first pass of the Capon algorithm may suggest that one or more signals is coming from a particular direction, and use of the CBCC of the sector of angles in and around this area may reveal that in fact two closely spaced signals are present.

The Bartlett and Capon Algorithms

The Capon and Bartlett DOA angle estimates are obtained as the arguments of the largest peaks of the estimated spatial power spectra. If $P(\theta)$ represents the estimated spectrum as a function of the angle $\theta$, then the maximum output provides an estimate of the signal power $\sigma_s^2$, and the signal DOA estimate is given by the scan value of $\theta$ that achieves this maximum; namely, $$\theta = \arg\max_\theta P(\theta), \tag{1}$$

assuming a single signal is present. It shall be assumed for the present theoretical analysis discussed that K signals are present in the data, and that the Capon/Bartlett parameter estimates $\hat{\theta}_K$, k=1, 2, . . . , K are obtained as the arguments of the K largest peaks of $P(\theta)$.

The Bartlett Algorithm

Let the conventional beamforming weight steered to angle $\theta$ for an array with element spatial locations $z_n$, n=1, 2, . . . , N be given by $v(\theta) = [e^{jk_\theta^T z_1}, e^{jk_\theta^T z_2}, \ldots, e^{jk_\theta^T z_N}]^T$, where $$k_\theta = \left(\frac{2\pi}{\lambda}\right) a(\theta)$$

is the wavenumber vector, $a(\theta)$ is the 3×1 unit vector pointing in the assumed direction of field propagation, $$\lambda = \frac{c}{f}$$

is the wavelength at temporal frequency f, and c is the wave propagation speed. Note that for a uniform linear array (ULA), this spatial filter weight can be easily implemented with the Fast Fourier Transform (FFT). The Bartlett spectral estimate evaluated at spatial frequency (or angle) $\theta$ is given by $$P_{Bartlett}(\theta) = \frac{1}{L}\sum_{l=1}^{L}|v^H(\theta)x(l)|^2 = \frac{1}{L} \cdot v^H(\theta)\hat{R}v(\theta) \tag{2}$$

with ambiguity function defined as $\psi_{Bartlett}(\theta) \Box v^H(\theta)Rv(\theta)$.

The Capon Algorithm

Capon proposed the following constrained optimization problem for the filterbank weight vector w $$\min_w w^H R w \text{ such that } w^H v(\theta) = 1 \tag{3}$$

$$\Rightarrow w_{MVDR} = \frac{R^{-1}v(\theta)}{v^H(\theta)R^{-1}v(\theta)},$$

that yields the well known minimum variance distortionless response (MVDR) filter as its solution. The optimal filter weight depends on the data covariance matrix R. By construction, this optimal filter will cancel all spatially coherent energy from all directions other than the scan direction $\theta$. The average output power is given by $$E\{|w_{MVDR}^H x|^2\} = \frac{1}{v^H(\theta)R^{-1}v(\theta)} \Box \psi_{Capon}(\theta) \tag{4}$$

$$E\{|w_{MVDR}^H x|^2\} = \frac{1}{v^H(\theta)R_N^{-1}v(\theta)} + \sigma_S^2,$$

where the Capon ambiguity function $\psi_{Capon}(\theta)$ has been defined. The equality in (4) holds only when the signal array response in R perfectly matches that used to form the weight vector, and when R is perfectly known. Capon, therefore, reasoned that for large enough sample support L, an estimate of the covariance R can be used with (4) to estimate the signal power $\sigma_s^2$ and the corresponding signal parameter θ. Using the SCM covariance estimate $\hat{R}=XX^H$, Capon proposed the following power spectral estimator $$P_{Capon}(\theta) = \frac{1}{L-N+1} \cdot \frac{1}{v^H(\theta)\hat{R}^{-1}v(\theta)}. \quad (5)$$

The term $P_{Capon}(\theta)$ can be further normalized to ensure that it is a true power spectral density.

Properties of Estimators

The Bartlett estimator has resolution capability limited by the aperture length (Fourier limit) independent of signal-to-noise ratio (SNR), and due to its vulnerability in the sidelobes various windows/tapers have been proposed for sidelobe control. The Capon estimator, however, has superior resolution ability that improves with SNR, and it adaptively nulls any coherent energy in the sidelobes while passing the direction of interest undistorted.

Both the Bartlett and Capon statistics have marginal distributions that are complex chi-squared [1, 8].

Cross Coherence and Joint PDF of Spectral Estimates

Define the filter weight steered to angle $\theta_b$ for the Bartlett algorithm as $w_{B=v(\theta_b)}$ and its output from a single snapshot as $y_B(\theta_b)$. Defining the clairvoyant filter weight steered to $\theta_a$ for the Capon algorithm as $$w_C = \frac{R^{-1}v(\theta_a)}{v^H(\theta_a)R^{-1}v(\theta_a)}$$

and its output based on the same spatial snapshot as $y_C(\theta_a)$ $$x \to \boxed{w_c} \to w_c^H x = y_C(\theta_a) \quad (6)$$
$$x \to \boxed{w_B} \to w_B^H x = y_B(\theta_a)$$
$$w_B^H x = y_B(\theta_b).$$

The cross coherence between these two filters is given by $$\cos^2\phi \square \frac{E\{|y_B(\theta_b) \cdot y_C^*(\theta_a)|^2\}}{E\{|y_B(\theta_b)|^2\} \cdot E\{|y_C(\theta_a)|^2\}} = \frac{\psi_{Capon(\theta_a)}}{\psi_{Bartlett(\theta_b)}} |v^H(\theta_a)v(\theta_b)|^2 \quad (7)$$

As implied by the denotation this measure of cross coherence can likewise be interpreted as a generalized cosine [2] between the optimal adaptive beamformer weight vector, i.e., any $\propto R^{-1}v(\theta_a)$, and a non-adaptive conventional beamforming weight vector, i.e., any $\propto v(\theta_b)$, where the metric space is defined by the true data covariance R, allowing one to also define the generalized sine $\sin^2\phi \square 1-\cos^2\phi$. Because of the weighting by the data covariance, this cosine can be less than unity even when the array responses are steered to the same direction, i.e. when $\theta_a = \theta_b$ The statistical dependence between the SCM based Bartlett and Capon spectral estimates is ultimately determined by this measure of cross coherence [7]. A summary is provided in the following subsections using the related but equivalent statistics below:

$$P_{Capon}(\theta_a) \square (L-N-1) \cdot P_{Capon}(\theta_a)$$

$$P_{Bartlett}(\theta_b) \square L \cdot P_{Bartlett}(\theta_b) \quad (8)$$

Partially Coherent Spectral Estimates: $0<\cos^2\phi<1$

Define the following 2×2 matrix:

$$\Xi \square \begin{bmatrix} \sqrt{\psi_{Capon(\theta_a)}} & v^H(\theta_a)v(\theta_b)\sqrt{\psi_{Capon(\theta_a)}} \\ 0 & \sqrt{\psi_{Bartlett(\theta_b)} \cdot \sin^2\phi} \end{bmatrix} \quad (9)$$

Let $\Theta \sim CW(L-N+1, I_2)$, i.e., standardized central 2×2 complex Wishart distributed matrix. If $\Delta \square \Xi^H \Theta \Xi$, then it follows that [4, 8]

$$\Delta \sim CW(L-N+1, \Xi^H \Xi), \quad (10)$$

where $$\Xi^H \Xi = \psi_{Capon(\theta_a)} \begin{bmatrix} 1 & v^H(\theta_a)v(\theta_b) \\ v^H(\theta_b)v(\theta_a) & \frac{\psi_{Bartlett(\theta_b)}}{\psi_{Capon(\theta_b)}} \end{bmatrix}. \quad (11)$$

It can be shown [7] that an equivalent stochastic representation for the Capon and Bartlett estimates when based on the same SCM is to a good approximation given by:

$$P_{Capon}(\theta_a) \stackrel{d}{=} [\Delta]_{1,1} \quad (12)$$

$$P_{Bartlett}(\theta_b) \stackrel{d}{=} [\Delta]_{2,2} + \chi_{N-1}^2 \cdot \psi_{Bartlett}(\theta_b)$$

where $X_{N-1}^2$ is a complex chi-squared statistic of N-1 degrees of freedom [8] independent of $\Delta$. This statistical summary shows that the adaptive and conventional spectral estimates are coupled via a 2×2 complex Wishart matrix. It also represents a generalization of the Capon-Goodman result [1], since it also conveys joint dependence and not just the marginal distributions of each statistic.

As an example of the utility of (12), note that the correlation coefficient of the SCM based spectral estimates, i.e., $$\rho_{CB} = \sqrt{\frac{\text{cov}[P_{Capon}(\theta_a), P_{Bartlett}(\theta_b)]}{\text{var}[P_{Capon}(\theta_a)] \cdot \text{var}[P_{Bartlett}(\theta_b)]}} \quad (13)$$

The term $\rho_{CB}$ is obtainable using known moments of complex Wishart matrices [3] and given exactly by $$\rho_{CB} = \sqrt{\frac{L-N+1}{L}} \cos^2\phi. \quad (14)$$

Perfectly Coherent Spectral Estimates: $\cos^2\phi=1$

By the Schwartz inequality it follows that $\cos^2\phi=1$, and therefore $\sin^2\phi=0$, if and only if $Rv(\theta_b) \propto v(\theta_a)$. Note that $\Xi$ will not be full rank in this case. It can be shown [7] that in this case the stochastic representation in (12) simplifies to $$\bar{P}_{Capon}(\theta_a) \stackrel{d}{=} c\chi^2_{L-N+1} \cdot \psi_{Capon}(\theta_a) \quad (15)$$

$$\bar{P}_{Bartlett}(\theta_b) \stackrel{d}{=} [c\chi^2_{L-N+1} + \chi^2_{N-1}] \times \tau \cdot \psi_{Bartlett}(\theta_b)$$

where $c\chi^2_{L-N+1}$ and $\chi^2_L$ are independent complex chi-squared statistics. The left subscript c on $c\chi^2_{L-N+1}$ is a tag to indicate that the same random variable is being referenced, and $\tau$ is real scalar related to the constant of proportionality for the general case of $Rv(\theta_b) \propto v(\theta_a)$.

Perfectly Incoherent Spectral Estimates: $\cos^2\phi = 0$

Note that if $v^H(\theta_a)v(\theta_b)=0$, i.e., the steering vectors are mutually orthogonal, then $\cos^2\phi=0$ from which it follows [7] that $\Xi^H\Xi$ is diagonal and the Capon and Bartlett spectral estimates are not only uncorrelated, but are also statistically independent even though based on the same SCM. The statistical summary becomes:

$$\bar{P}_{Capon}(\theta_a) \stackrel{d}{=} \chi^2_{L-N+1} \cdot \psi_{Capon}(\theta_a) \quad (16)$$

$$\bar{P}_{Bartlett}(\theta_b) \stackrel{d}{=} \chi^2_L \cdot \psi_{Bartlett}(\theta_b)$$

where $\chi^2_{L-N+1}$ and $\chi^2_L$, are independent complex chi-squared statistics. Clearly, the correlation in the sidelobe structure of the beam-pattern is the major determinant of the level of coherence between the Capon and Bartlett estimates.

Cross Spectral Estimate

Since the cross coherence defined in (7) clearly plays a critical role in the describing the dependence between these two spectral estimates, it is reasonable to consider what can be learned or inferred from a SCM based estimate of this measure. An example embodiment of the present invention is the SCM based estimate of the cross-spectra of the Capon and Bartlett algorithms as $$P_{CB}(\theta_a, \theta_b) = \frac{|v^H(\theta_a)v^H(\theta_b)|^2\left[\frac{L}{L-N+1}\right]}{v^H(\theta_a)\hat{R}^{-1}v(\theta_a) \cdot v^H(\theta_b)\hat{R}v(\theta_b)}. \quad (17)$$

The distribution of this new statistics can be determined from (12) (see [7]). In the next section, its use in resolving signals is demonstrated.

Numerical Examples

Consider a Direction of Arrival (DOA) estimation scenario involving two equal power planewave sources and a set of signal bearing snapshots $$x(l) \sim CN\left[0, I + \sum_{k=1}^{2}\sigma^2_{S_k}v(\theta_k)v^H(\theta_k)\right] \quad (18)$$

l=1, 2, . . . , L for an N=18 element uniform linear array (ULA) with slightly less than $\lambda/2$ element spacing, and L=3N snapshots. The array has a 3 dB beamwidth of 7.2 degrees and the desired target signals are placed at $\theta_1$=90 degrees (array broadside), $\theta_2$=93 degrees (less than half a beamwidth separation).

Figure 4:
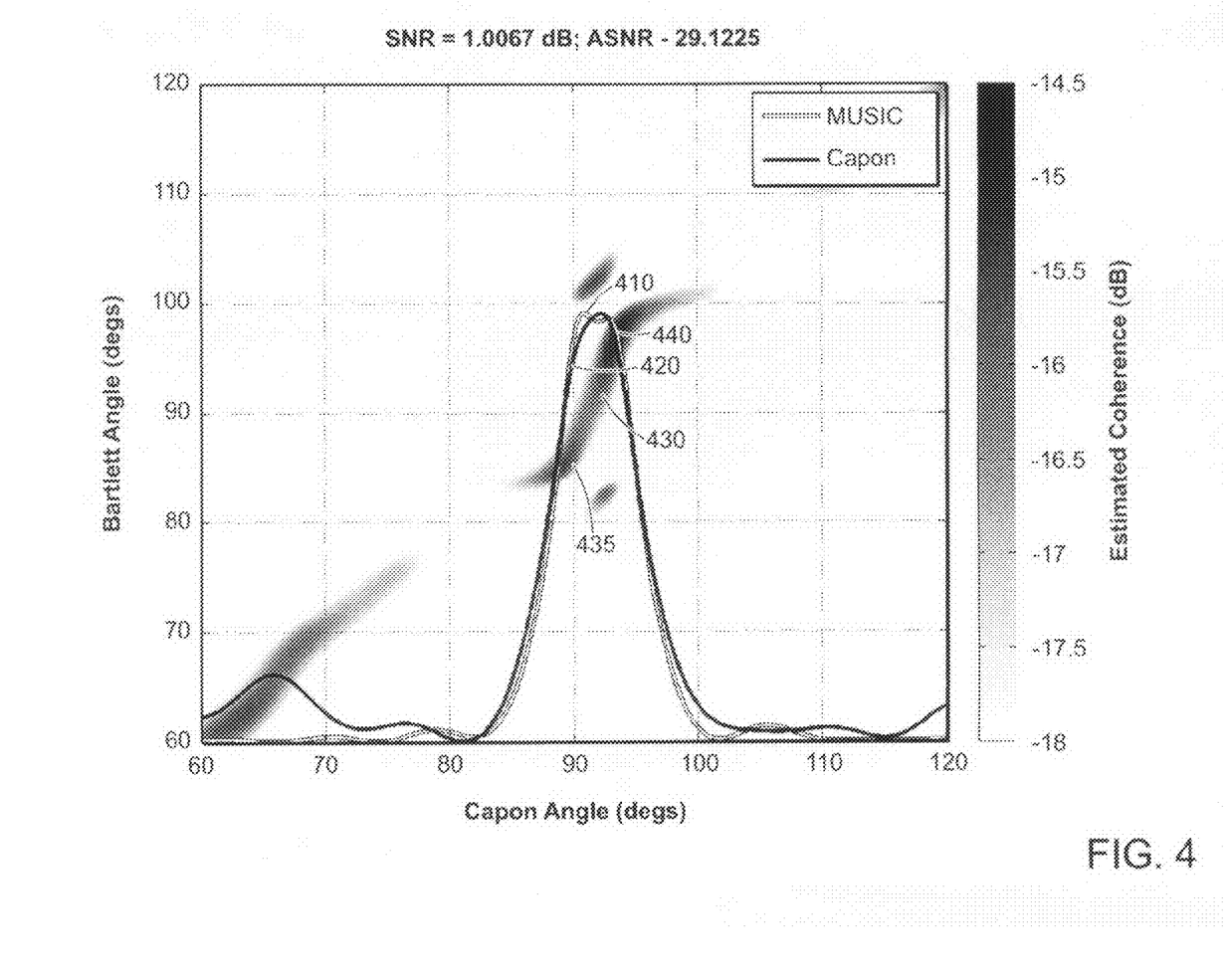
FIG. 4 is a single realization demonstrating resolution of cross spectrum.

FIG. 4 illustrates the cross spectrum estimate $P_{CB}(\theta_a, \theta_b)$ shown by the gray color scale. Plotted on top of this image are normalized versions of the Capon 420 and MUSIC algorithm 410 1-D spectra for comparison. This is an example for which the MUSIC algorithm 410 was able to resolve two signals at $\sigma^2_{S_k}$=1 dB, but the Capon algorithm 420 has failed. The cross spectrum 430, however, shows two distinct peaks 435, 440 located at the same angles as the two peaks of the MUSIC algorithm 410, but obtained without knowledge of the rank of the signal subspace. This is clearly a single realization in which the true probability of resolution for the Capon algorithm 420 is a little less than 10 percent. Averaging over several realizations, an empirically based estimate of the probability of resolution can be obtained for all three algorithms.

Figure 5:
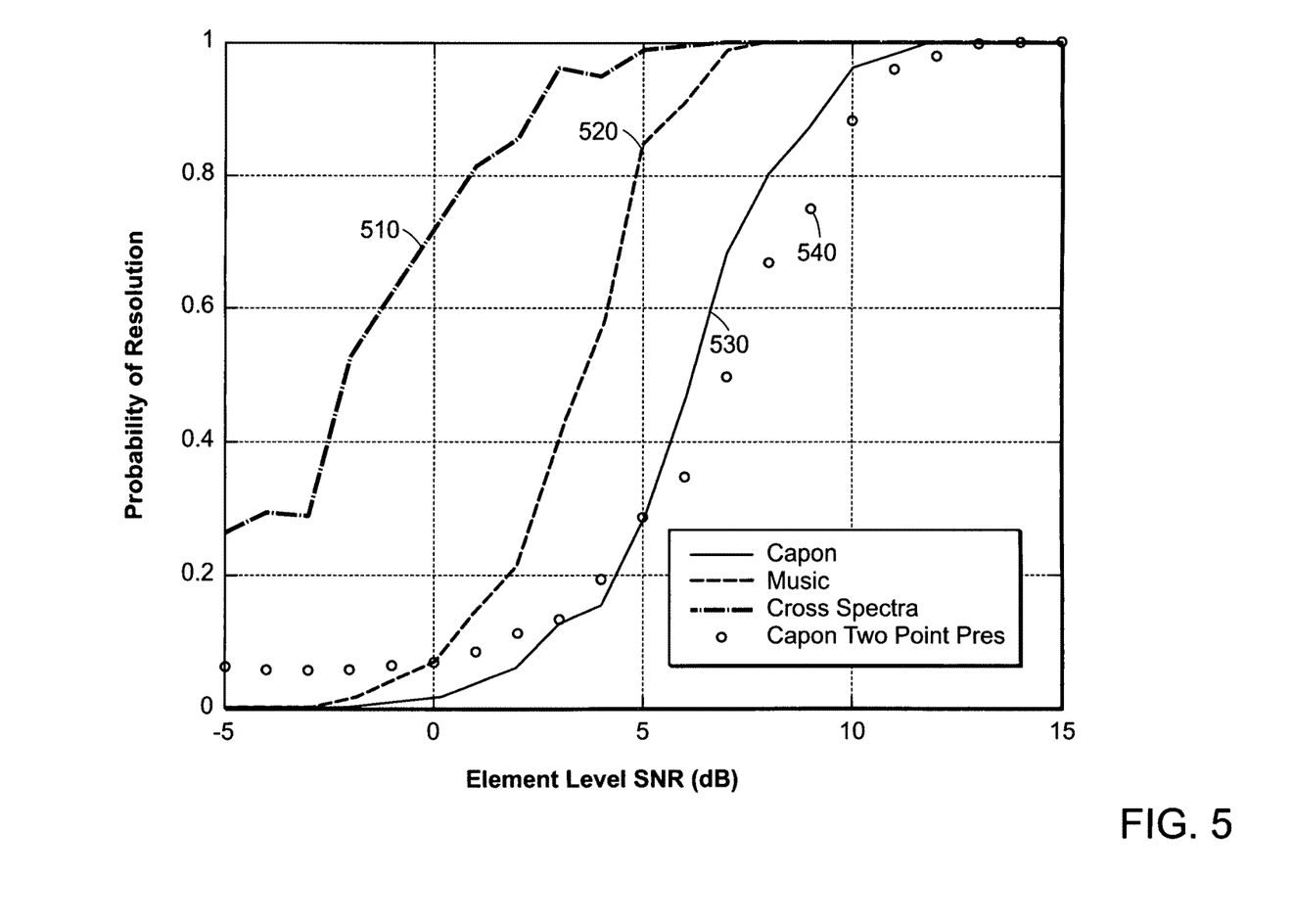
FIG. 5 demonstrates probability of resolution of cross-spectrum vs. signal to noise ratio (SNR).

FIG. 5 illustrates the probability of resolution of cross spectrum vs. SNR. Using the same parameters as those used in obtaining FIG. 4, the results are illustrated in FIG. 5 and based on 150 Monte Carlo simulations for each SNR point. Included for comparison is the theoretical two-point probability 540 of resolution derived for the Capon algorithm [6]. The two signals were declared resolved for the Capon 510 and MUSIC 520 algorithms if two peaks appeared in the spectrum within the range of 88 to 95 degrees. For the cross-spectrum 530 the two signals were declared resolved if two-peaks appeared in the slanted slither of a ±7 degree band of Bartlett angles about the diagonal of the spectrum, but within the Capon angle range of 88 to 95 degrees. This figure shows significant improvement of resolution by the cross spectrum 530 over both the Capon algorithm 510 and MUSIC 520 for this particular example.

Noise only array observations $X_N=[n(\tilde{t}_1)||n(\tilde{t}_M)]$ could be observed for some period of time from which a noise only data covariance estimate is obtained, e.g. the noise SCM $\hat{R}_{N=XN}X_N^H$. A cross coherence estimate can be obtained based on this noise such that $$P^N_{CB}(\theta_a, \theta_b) = \frac{|v^H(\theta_a)v(\theta_b)|^2}{v^H(\theta_a)\hat{R}_N^{-1}v(\theta_a)v^H(\theta_b)\hat{R}_Nv(\theta_b)} \quad (19)$$

This could be used to normalize the aforementioned cross coherence estimate $P_{CB(\theta_a, \theta_b)}$ based on the signal plus noise array observations to obtained a normalized spectral estimate:

$$\tilde{P}_{CB}(\theta_a, \theta_b) = \frac{P_{CB}(\theta_a, \theta_b)}{P^N_{CB}(\theta_a, \theta_b)} \quad (20)$$

Normalization standardizes dynamic range and permits thresholds to be set for signal detection.

Figure 6:
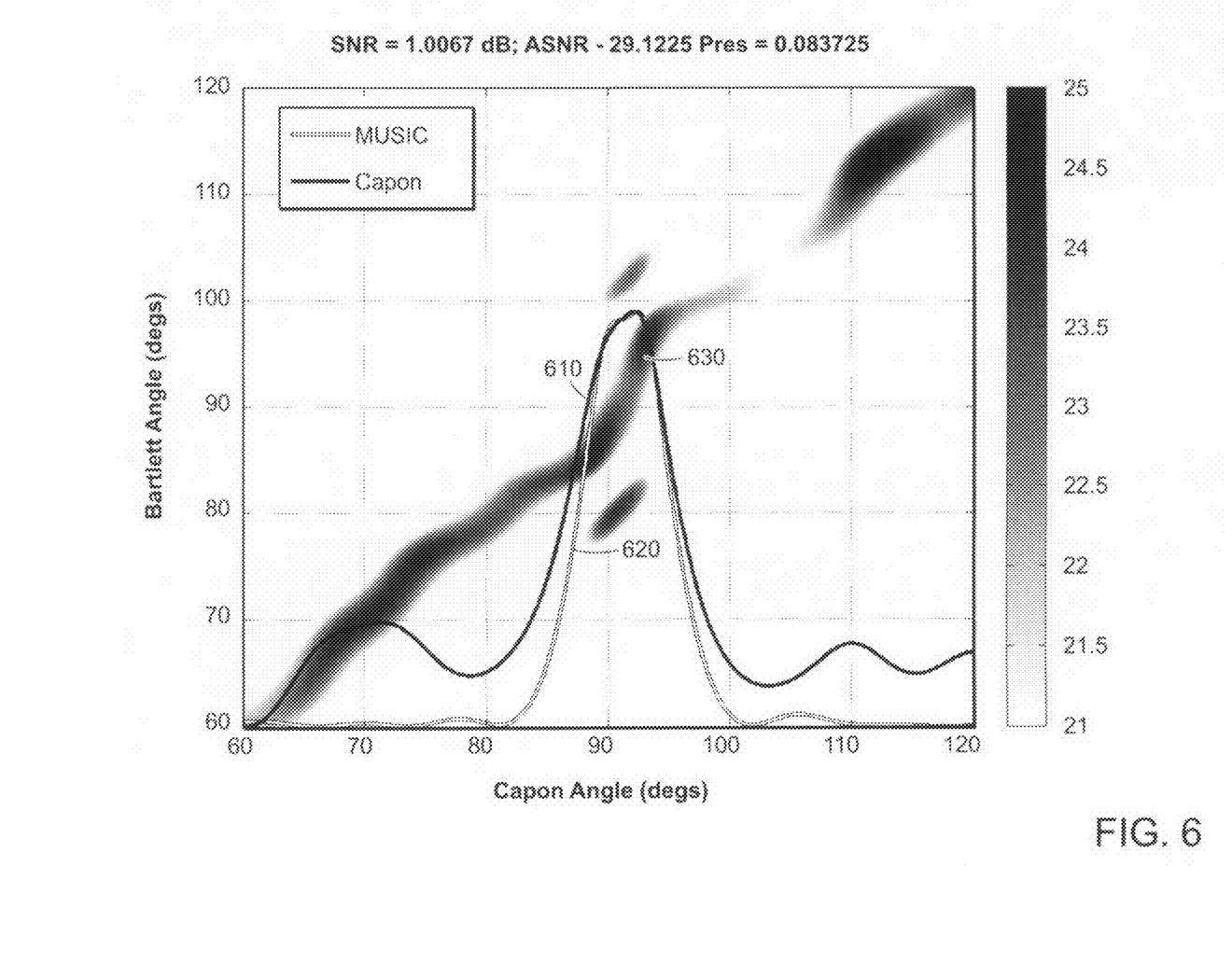
FIG. 6 is a single realization demonstrating resolution of a normalized spectrum.

FIG. 6 is a single realization demonstrating resolution of a normalized spectrum estimate shown by gray color scale. Normalized versions of the Capon 620 and MUSIC algorithm 610 are illustrated for comparison. As shown in the plot, the cross spectrum 630 has been able to resolve the two signals.

General Purpose Spectral Analyzer

The Capon-Bartlett cross coherence spectrum (CBCC) is a two-stage general purpose spectral analyzer that can be used to assess the spectral content of data. Spectral analysis forms the basis of signal processing for many fields of study since the goal is often to identify periodicities in the data and/or to assess power distribution as a function of temporal/spatial frequency [9]. An example embodiment of the present invention builds on possible correlations between two well-known established approaches to spectral estimation: Bartlett (or smoothed periodogram) method [11, 12] and the Capon [or the data-adaptive minimum-variance distortionless response (MVDR)] method [9, 10]. When a given data set is processed via both the Bartlett and Capon algorithms, the CBCC can look for possible correlations in their outputs across different temporal/spatial frequencies (i.e. measure correlations across filters at different center frequencies). If original spectra are one dimensional then the net result is a two-dimensional (in frequency) spectrum where the second frequency/dimension provides additional information about the first frequency/dimension. This second frequency provides a dimension capable of improving the resolution of the 1-D Capon algorithm in a numerically efficient and simple manner. This improved resolution is achieved specifically for two closely spaced sources, or a collection of closely spaced pairs of sources each well separated from the other.

One embodiment of the present invention relates to spectral analysis that exploits the existing coherence (linear relationship) between a conventional Fourier-based approach (Bartlett) and the adaptive minimum-variance distortionless response (Capon or MVDR) approach. The conventional Bartlett algorithm is a filterbank approach to spectral estimation that averages over time the output power of the Fourier Transform (which for a given frequency bin is a crude bandpass filter) of the data. This algorithm is known to have resolution, i.e., ability to determine whether a single signal is present versus multiple closely spaced (in frequency or angle) signals, limited by the duration/length of integration (time window duration used for temporal Fourier transform, or in space the aperture length for sensor arrays). The Bartlett algorithm is known to be vulnerable to interference through its conventional filter sidelobes. The Capon algorithm is also a filterbank approach to spectral estimation but the filters are designed optimally. In particular each filter is designed to pass the frequency/direction of interest undistorted (a passband constraint), while minimizing the output power from all other frequencies/directions (a stopband constraint). The Capon filter solution depends on the true underlying data covariance matrix, has superior resolution capability (relative to the Bartlett algorithm) dependent on signal-to-noise ratio (SNR), and mitigates competing interfering signals via whitening, but is sensitive to errors in assumed array response and finite sample effects in covariance estimation [2, 6].

Another example embodiment of the present invention estimates the coherence between the outputs of two processors. Cross-coherence is fundamentally a measure of linear relationship. Indeed, when two vectors/signals/functions/etc. are proportional to each other, then their cross-coherence is unity whereas orthogonal vectors have a cross-coherence of zero. These processors are dependent in general when based on the same data covariance even when evaluated at different frequencies. This new CBCC is a 2-D spectrum obtained by combining the 1-D spectra of the Bartlett and Capon algorithms in a way that is numerically efficient and provides a unique space in which improved resolving capability over the Capon algorithm is observed for two closely spaced signals. The numerical efficiency is possible because the data-dependent part of the CBCC is separable and the inseparable part can be pre-computed and stored in memory [13]. Consider the challenge of estimating the directions-of-arrival (angles/spatial frequencies) of two planewave equal power signals in a background of white noise from observations made on an array of sensors (antennas, or hydrophones, e.g.). If a conventional Fourier based beam (conventional beamformer or CBF) is steered until its first natural null falls on one of these two signals, then the output of this beam will be nearly linearly related to the output of the adaptive Capon beam pointed at the other source. Thus, its measure of coherence will increase. The CBCC exploits this notion to obtain improved resolution by scanning CBF beams in the vicinity of an observed (often relatively wide) peak of the Capon processor.

Example embodiments of the present invention may be used as a general purpose spectral analysis tool with application in numerous areas including radar, sonar/underwater acoustics, seismology, astronomy, medical imaging, and communications. Angle-of-arrival estimation via an array of sensors is a common goal in several of these applications. Use of the CBCC as a second pass analysis tool to drill down into the data after a first pass Capon-MVDR spectral analysis has identified a region of interest (frequency band, angular sector, etc.) is the most likely approach. For example, a first pass of the Capon algorithm may suggest that one or more signals are coming from a particular direction, and use of the CBCC of the sector of angles in and around this area may reveal that in fact two closely spaced signals are present.

Advantages and Improvements Over Existing Methods

The CBCC spectrum helps close the gap in resolution performance between MUSIC and Capon-MVDR at very negligible computational cost. The improved resolution is obtained by searching in a second frequency domain over a new measure of cross coherence. This search along an additional dimension is only required after a first pass 1-D search with the Capon-MVDR algorithm has identified the regions of interest (locus of wide peaks in the 1-D spectrum). The CBCC closes the indicated performance gap primarily for two closely spaced sources, or sets well-separated closely spaced pairs of sources. If more than two sources are closely spaced, then MUSIC tends to resolve such larger clusters better [13].

Commercial Applications

The commercial applications are broad since spectral analysis is ubiquitous across many fields of discipline including radar, sonar/underwater acoustics, seismology, astronomy, medical imaging, and communications. Angle-of-arrival estimation via an array of sensors is a common goal in several of these applications.

Use of the CBCC as a second pass analysis tool to drill down into the data after a first pass Capon-MVDR spectral analysis has identified a region of interest (frequency band, angular sector, etc. is the most likely approach). For example, a first pass of the Capon algorithm may suggest that one or more signals is coming from a particular direction, and use of the CBCC of the sector of angles in and around this area may reveal that in fact two closely spaced signals are present.

It should be understood that procedures, such as those illustrated by flow diagram or block diagram herein or otherwise described herein, may be implemented in the form of hardware, firmware, or software, executed in any device such as a general purpose computer or an application specific computer. If implemented in software, the software may be implemented in any software language consistent with the teachings herein and may be stored on any computer-readable medium known or later developed in the art. The software, typically, in form of instructions, can be coded and executed by a processor in a manner understood in the art.

While this invention has been particularly shown and described with references to example embodiments thereof, it will be understood by those skilled in the art that various changes in form and details may be made therein without departing from the scope of the invention encompassed by the appended claims.

References, all of which are incorporated by reference in their entirety:
1. J. Capon, N. R. Goodman, "Probability Distributions for Estimators of Frequency Wavenumber Spectrum," *Proceedings of the IEEE*, Vol. 58, No, 10, 1785-1786 (1970).
2. H. Cox, "Resolving Power and Sensitivity to Mismatch of Optimum Array Processors," *Journal of the Acoustical Society of America*, Vol. 54, No. 3, pp. 771-785, 1973.
3. D. Maiwald, D. Kraus, "Calculation of Moments of Complex Wishart and Complex Inverse Wishart Distributed Matrices," *IEE Proc.-Radar, Sonar, Navig.*, Vol. 147, No. 4, pp. 162-168, August 2000.
4. R. J. Muirhead, *Aspects of Multivariate Statistical Theory*, John Wiley & Sons, Inc. 1982.
5. C. D. Richmond, R. Rao Nadakuditi, A. Edelman, "Asymptotic Mean Squared Error Performance of Diagonally Loaded Capon-MVDR Algorithm," *Proceedings of the Thirty-Ninth Asilomar Conference on Signals, Systems& Computers*, pp. 1711-1716, Oct. 28-Nov. 1, 2005.
6. C. D. Richmond, "Capon Algorithm Mean Squared Error Threshold SNR Prediction and Probability of Resolution," *IEEE Transactions on Signal Processing*, Vol. 53, No. 8, pp. 2748-2764, August 2005.
7. C. D. Richmond, "The Cross Spectra of the Capon and Bartlett Algorithms and A Generalization of the Capon-Goodman Result," to be submitted to the *IEEE Transactions on Signal Processing*.
8. A. O. Steinhardt, "Adaptive Multisensor Detection and Estimation," Chapter 3 of Adaptive *Radar Detection and Estimation*, Edited by S. Haykin and A. O. Steinhardt, John Wiley & Sons, Inc., 1992.
9. P, Stoica, R. Moses, *Spectral Analysis of Signals*, Pearson Prentice-Hall, Upper Saddle River, N.J., 2005.
10. J. Capon, "High-Resolution Frequency-Wavenumber Spectrum Analysis," *Proceedings of the IEEE*, Vol. 57, 1408-4418 (1969).
11. M. S. Bartlett, "Smoothing Periodograms from Time Series with Continuous Spectra," Nature, Vol. 161, pp. 686-687, 1948.
12. M. S. Bartlett, "Periodogram Analysis and Continuous Spectra," *Biorrletrika*, Vol. 37, pp. 1-16, 1950.
13. C. D. Richmond, "Cross Coherence and Joint PDF of the Bartlett and Capon Power Spectral Estimates," *Proceedings of the IEEE International Conference on Acoustics, Speech, and Signal Processing*, Vol. II, pp. 901-904, Apr. 15-20 2007, Honolulu, Hi.
14. A. J. Barabell, J. Capon, D. F. Delong, J. R. Johnson, and K. Senne, "Performance Comparison of Superresolution Array Processing Algorithms," Project Report TST-72, Lincoln Laboratory, MIT, 1984.

What is claimed is:

1. A machine implemented method for spectral analysis in computing hardware, the method comprising:
   in a processor:
   determining a measure of cross coherence between application of an adaptive spectral estimation filter having a first weight to data to generate a first power-frequency spectrum with a first resolution and a conventional spectral estimation filter having a second weight to the same data to generate a second power-frequency spectrum with a second resolution, the determining performed by cross-correlating the first-power frequency spectrum of the adaptive spectral estimation filter with the second power-frequency spectrum of the conventional spectral estimation filter, wherein the measure of cross coherence is a power-frequency spectrum with a higher resolution than the first resolution of the first power-frequency spectrum or the second resolution of the second power-frequency spectrum, the measure of cross coherence adapted to resolve at least two closely spaced features at the higher resolution; and
   identifying a spectral feature of the measure of cross coherence.

2. The method of claim 1 wherein the step of identifying the spectral feature of the measure of cross coherence comprises identifying largest peaks of an estimated power spectrum of the measure of cross coherence.

3. The method of claim 1 wherein the step of identifying the spectral feature of the measure of cross coherence comprises obtaining frequency estimates of a wave.

4. The method of claim 3 wherein the wave includes an acoustic, electromagnetic, seismic, gravitational, or an optical wave.

5. The method of claim 1 wherein the step of identifying the spectral feature of the measure of cross coherence comprises obtaining direction of arrival angle estimates or frequency estimates of a wave.

6. The method of claim 1 wherein the measure of cross coherence is determined as at least one of a generalized cosine between beamformer filter weight vectors, and frequency estimates corresponding to the adaptive spectral estimation filter and the conventional spectral estimation filter.

7. The method of claim 1 comprising applying the data to the adaptive spectral estimation filter and the conventional spectral estimation filter and computing the measure of cross coherence based on the outputs of the adaptive spectral estimation filter and the conventional spectral estimation filter.

8. The method of claim 1 wherein the data is obtained from a finite set of observations taken over time and assembled into a matrix.

9. The method of claim 1 wherein the data is obtained from an observation across an array of sensors.

10. The method of claim 1 wherein the measure of cross coherence is calculated as a function of beamforming or spectral filtering weight vectors and a data covariance matrix estimate.

11. The method of claim 10 wherein the beamforming weight vectors or the spectral filtering weight vectors are obtained as a function of position of sensors in an array used to obtain the data, a steering angle, direction of field propagation and field temporal frequency.

12. The method of claim 1 further including normalizing the measure of cross coherence as a function of signal plus noise array observations to obtain a normalized spectral estimate.

13. The method of claim 1 further including processing the data based on the spectral feature based on the outputs of the spectral estimation filter and the conventional spectral estimation filter.

14. A machine implemented method for spectral analysis in computing hardware comprising:
   using an adaptive filter having a first weight, scanning data to generate a first power-frequency spectrum with a first resolution;
   using a conventional filter having a second weight, scanning the same data to generate a second power-frequency spectrum with a second resolution; and
   cross-correlating the first power-frequency spectrum of the adaptive filter and the second power-frequency spectrum of the conventional filter to determine a measure of cross coherence, the measure of cross coherence identifying a spectral feature of the data, wherein the measure of cross coherence is a power-frequency spectrum with a higher resolution than the first resolution of the first power-frequency spectrum or the second resolution of the second power-frequency spectrum, the measure of cross coherence adapted to resolve at least two closely spaced features at the higher resolution.

15. The method of claim 14 wherein the data is scanned over n dimensions in the adaptive filter, the data is scanned over m dimensions in the conventional filter, and the outputs are cross-correlated in n+m dimensions.

16. The method of claim 14 comprising obtaining the data from an observation across an array of sensors.

17. The method of claim 14 comprising obtaining the data from a finite set of observations taken over time and assembled into a matrix.

18. A machine implemented method for spectral analysis in computing hardware comprising:
in a processor:
filtering data with an adaptive filter to determine a first power spectrum estimate representing a region of interest, the first power spectrum estimate having a first resolution;
filtering the same data with a conventional filter to determine a second power spectrum estimate, the second power spectrum estimate having a second resolution;
determining a measure of cross coherence between application of the adaptive filter and the conventional filter to the same data based on the determined region of interest by cross-correlating the first-power frequency spectrum of the adaptive spectral estimation filter with the second power-frequency spectrum of the conventional spectral estimation filter, wherein the measure of cross coherence is a power-frequency spectrum with a higher resolution than the first resolution of the first power-frequency spectrum or the second resolution of the second power-frequency spectrum, the measure of cross coherence adapted to resolve at least two closely spaced features at the higher resolution; and
identifying a spectral feature of the measure of cross coherence.

19. An apparatus for spectral analysis comprising:
a determination module configured to determine a measure of cross coherence between application of an adaptive spectral estimation filter to data to determine a first power-frequency spectrum having a first resolution and a conventional spectral estimation filter to the same data to determine a second power-frequency spectrum having a second resolution, the measure of cross coherence identifying a spectral features of the data, wherein the measure of cross coherence is a power-frequency spectrum with a higher resolution than the first resolution of the first power-frequency spectrum or the second resolution of the second power-frequency spectrum, the measure of cross coherence adapted to resolve at least two closely spaced features at the higher resolution; and
an identification module configured to identify a spectral feature of the measure of cross coherence.

20. The apparatus of claim 19 wherein the identification module is arranged to identify the spectral feature of the measure of cross coherence as a function of identifying largest peaks of an estimated power spectrum of the measure of cross coherence.

21. The apparatus of claim 19 wherein the step of identifying the spectral feature of the measure of cross coherence comprises obtaining frequency estimates of a wave.

22. The apparatus of claim 21 wherein the wave includes an acoustic, electromagnetic, seismic, gravitational, or an optical wave.

23. The apparatus of claim 19 wherein the identification module is arranged to identify the spectral feature of the measure of cross coherence as a function of obtaining direction of arrival angle estimates of a wave.

24. The apparatus of claim 19 wherein the determination module is arranged to determine the measure of cross coherence between application of the adaptive spectral estimation filter and the conventional spectral estimation filter to data as a function of a generalized cosine between beamformer filter weight vectors corresponding to the adaptive spectral estimation filter and the conventional spectral estimation filter.

25. The apparatus of claim 19 wherein the determination module is arranged to apply the data to the adaptive spectral estimation filter and the conventional spectral estimation filter and compute the measure of cross coherence based on the outputs of the adaptive spectral estimation filter and the conventional estimation filter.

26. The apparatus of claim 19 wherein the data is obtained from a finite set of observations taken over time and assembled into a matrix.

27. The apparatus of claim 19 wherein the data is obtained from an observation across an array of sensors.

28. The apparatus of claim 19 wherein the measure of cross coherence is calculated as a function of beamforming or spectral filtering weight vectors and a data covariance matrix estimate.

29. The apparatus of claim 19 wherein the beamforming weight vectors or the spectral filtering weight vectors are obtained as a function of position of sensors in an array used to obtain the data, a steering angle, direction of field propagation and field temporal frequency.

30. The apparatus of claim 19 wherein the determination module is arranged to normalize the measure of cross coherence as a function of signal plus noise array observations to obtain a normalized spectral estimate.

31. A non-transitory computer readable medium having computer readable program codes embodied therein for spectral analysis, the computer readable medium program codes including instructions that, when executed by a processor, cause the processor to:
determine a measure of cross coherence between application of an adaptive spectral estimation filter to data to determine a first power-frequency spectrum having a first resolution and a conventional spectral estimation filter to the same data to determine a second power-frequency spectrum having a second resolution, the measure of cross coherence identifying a spectral features of the data, wherein the measure of cross coherence is a power-frequency spectrum with a higher resolution than the first resolution of the first power-frequency spectrum or the second resolution of the second power-frequency spectrum, the measure of cross coherence adapted to resolve at least two closely spaced features at the higher resolution; and
identify a spectral feature of the measure of cross coherence.

32. The method of claim 15, wherein the outputs are cross-correlated in n+m dimensions to provide additional information about the first n dimensions.

* * * * *